Mar. 3, 1925.                                                                1,528,095
J. L. BREDAR
OIL VALVE DRAIN
Filed May 5, 1922

J. L. Bredar, Inventor

By C. A. Snow & Co.
Attorney

Patented Mar. 3, 1925.

1,528,095

UNITED STATES PATENT OFFICE.

JOSEPH L. BREDAR, OF ROCK ISLAND, ILLINOIS.

OIL-VALVE DRAIN.

Application filed May 5, 1922. Serial No. 558,742.

*To all whom it may concern:*

Be it known that I, JOSEPH L. BREDAR, a citizen of the United States, residing at Rock Island, in the county of Rock Island and State of Illinois, have invented a new and useful Oil-Valve Drain, of which the following is a specification.

By way of explanation it may be stated that in accordance with the present practice, when the crank case of an internal combustion engine on an automobile is to be drained of oil, it is necessary to screw a plug out of the crank case. This operation renders it necessary for the operator to crawl under the vehicle, the plug frequently drops into the oil bucket therebeneath, and, generally, the process of draining a crank case on an automobile is inconvenient.

The foregoing being understood, the present invention aims to provide a simple means whereby through the instrumentality of a rotary valve, the crank case of an automobile may be drained.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawing:—

Figure 1:
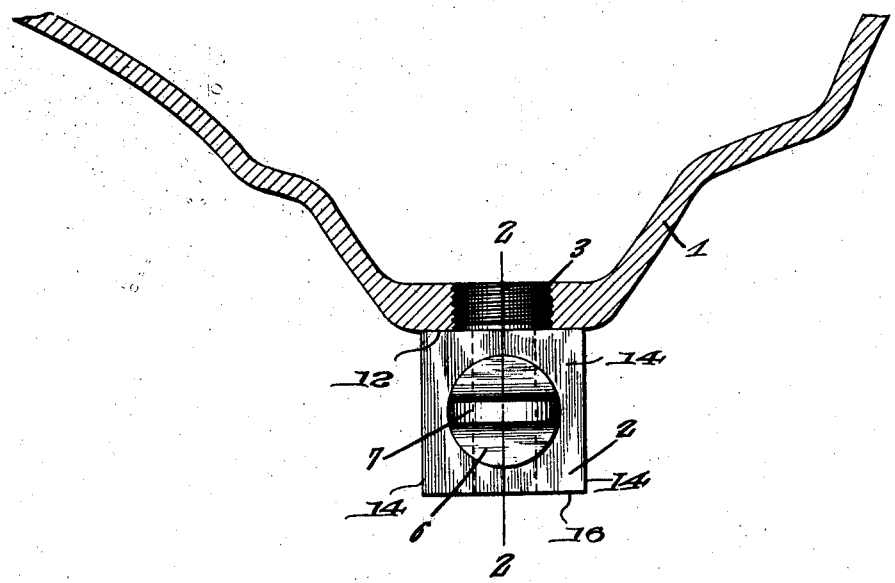
Figure 2:
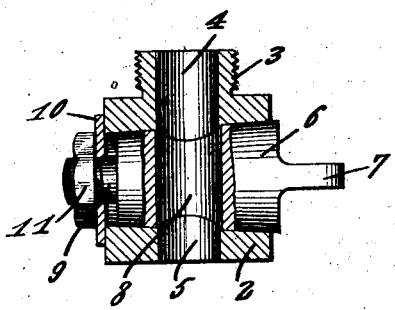

Figure 1 shows in elevation, a device constructed in accordance with the invention, assembled with a portion of the crank case of an automobile engine, the case appearing in section; Figure 2 is a section on the line 2—2 of Figure 1, the crank case being omitted.

The numeral 1 marks the crank case of an internal combustion engine on an automobile. In carrying out the invention there is provided a valve casing 2 having a neck 3 which is threaded into the crank case 1. The neck 3 has a bore 4, the casing having an outlet opening 5 alined with the bore. A valve 6, of tapered or other construction is mounted to rotate in the casing 2 and has a finger piece 7 whereby the valve may be rotated. A transverse port 8 is formed in the valve 6 and is adapted to be brought into and out of registration with the bore 3 and the outlet 5. The valve 6 is supplied with a stem 9 whereon is mounted a washer 10, abutting against the valve casing 2, a nut 11 being threaded on the stem 9 and cooperating with the washer, to hold the valve in the valve casing for rotation.

It is obvious that by a simple rotation of the valve 6, the port 8 of the valve may be brought into such a position as to effect a draining of the crank case 1, it being unnecessary for the operator to tolerate the inconveniencies which result when a threaded plug must be removed from a crank case to effect a draining of the oil in the crank case.

Briefly considered, the device forming the subject matter of this application comprises a crank case 1, a casing 2 having a neck 3 threaded into the lower portion of the crank case, and a valve 6 mounted to rotate in the casing and controlling the flow of oil from the crank case through the casing, the casing being of approximately cubical form to promote its strength with a minimum expenditure of material, to define a flat end surface 12 adapted to abut against the crank case, to define flat side surfaces 14, to any of which a wrench may be applied when the valve is removed, and to define a flat bottom surface 16, devoid of projections with which an obstacle may engage.

What is claimed is:—

In a device of the class described, a crank case, a casing having a neck threaded into the lower portion of the crank case, and a valve mounted to rotate in the casing and controlling the flow of oil from the crank case through the casing, the casing being of approximately cubical form to promote its strength with a minimum expenditure of material, to define a flat end surface adapted to abut against the crank case, to define flat side surfaces, to any of which a wrench may be applied when the valve is removed, and to define a flat and unincumbered bottom surface.

In testimony that I claim the foregoing as my own, I have hereto affixed my signature in the presence of two witnesses.

JOSEPH L. BREDAR.

Witnesses:
L. C. RAMSDALE,
JOHN P. SEXTON.